United States Patent

Kühnhenrich

[11] Patent Number: 5,373,879
[45] Date of Patent: Dec. 20, 1994

[54] PROCESS FOR MACHINING BLANKS MADE OF WOOD OR SIMILAR MATERIALS, SUCH AS PLASTIC

[75] Inventor: Ludger Kühnhenrich, Koblenz, Germany

[73] Assignee: Hoffmann & Kuhnhenrich GmbH, Koblenz, Germany

[21] Appl. No.: 946,306
[22] PCT Filed: May 29, 1991
[86] PCT No.: PCT/DE91/00466
 § 371 Date: Oct. 26, 1992
 § 102(e) Date: Oct. 26, 1992
[87] PCT Pub. No.: WO91/18722
 PCT Pub. Date: Dec. 12, 1991

[30] Foreign Application Priority Data

Jun. 5, 1990 [DE] Germany ............................ 4017991

[51] Int. Cl.$^5$ ............................ B27C 1/12; B27B 1/00
[52] U.S. Cl. .............................. 144/356; 83/364; 83/367; 144/242 R; 144/246 R; 144/249 A; 144/117 R; 198/464.2; 198/572; 198/782
[58] Field of Search ............. 83/360, 364, 367; 144/242 R, 246 R, 246 R, 246 E, 246.6, 249 R, 249 A, 356, 357, 116, 117 R; 198/341, 464.2, 572, 782

[56] References Cited

U.S. PATENT DOCUMENTS

| | | | |
|---|---|---|---|
| 2,985,205 | 5/1961 | Mann | 144/249 A |
| 4,343,209 | 8/1982 | Moelbert | 83/364 |
| 4,457,350 | 7/1984 | Finnila | 144/249 A |
| 4,583,576 | 4/1986 | Rautio | 144/249 A |
| 4,907,632 | 3/1990 | Reuter | 198/782 |
| 5,285,887 | 2/1992 | Hall | 198/572 |

FOREIGN PATENT DOCUMENTS

| | | | |
|---|---|---|---|
| 2916828 | 11/1980 | Germany | 144/249 A |
| 1291097 | 7/1991 | Germany | |

Primary Examiner—W. Donald Bray
Attorney, Agent, or Firm—Herbert Dubno

[57] ABSTRACT

Elongated wood blanks are fed on a table toward a machining tool such as a planar. The leading end of each blank is engaged by a driven input roller at the upstream side of the tool and advanced by the input roller into engagement with the tool and past the tool. A driven advance roller downstream of the tool then engages each input end to draw the blank past the tool for machining the length of the blank. As soon as the leading end of a finger engages the advance roller, the input roller pressure on the blank is relieved and, when the trailing end of the blank passes the advance roller, the input roller is repositioned to engage the leading end of the next blank.

6 Claims, 3 Drawing Sheets

PROCESS FOR MACHINING BLANKS MADE OF WOOD OR SIMILAR MATERIALS, SUCH AS PLASTIC

CROSS REFERENCE TO RELATED APPLICATIONS

This application is a national phase of PCT/DE91/00466 filed May 29, 1991 and based, in turn, upon German National Application P 40 17 991.5 filed Jun. 5, 1990 under the International Convention.

FIELD OF THE INVENTION

My present invention relates to a process for machining blanks made of wood or similar materials, such as plastic or the like, by means of planing machines or the like, wherein by means of a feeding device oblong wood blanks are moved on a bearing or guide surface in a longitudinal direction with respect to themselves, with their frontal end towards a rotating tool, such as a planer head, until the machined front end is seized by an advance roller provided downstream of the tool and is further transported over a reference table.

BACKGROUND OF THE INVENTION

In order to machine wood blanks according to the above process, planing machines, automatic four-edge planing machines, automatic thicknessing machines, automatic profile cutting machines, planing, grooving and keying machines and others are used.

The rotating cutting tools work on the wood blank against its advance direction, so that during the advance the cutting reactions translate into a resistance which has to be overcome. When the front end of the wood blank has passed the cutting tool and has made contact with the first advance roller, then the latter is capable to insure the further advance with its own conveying force, namely with the optimal advance speed required by the machining process.

The known processes have certain problems related to the conveying of the wood blank into the machine, past the rotating tool up to the point of contact with the first advance roller.

Manual feeding is widely used. This procedure requires a certain practice and experience, as well as persistence and concentration of the operator, in order to feed the blanks with the necessary force and at the same time with the required constant advance speed until the front end of the blank reaches the first advance roller. Even experienced operators make mistakes at times, with the result that during the machining process or as the rotating tool is passed, the front end of the wood blank receives chatter marks as a result of the uncontrolled advance speed and the variable contact pressure.

Manual feeding is labor intensive and therefore expensive. At today's state of the art it is acceptable only in a craftsmanship operation. At least the front ends of the wood blanks damaged by chatter marks have to be cut off, since they are unsuitable for further use. So there is more or less waste. However, if the wood blanks have been precut to the desired length, then the finished wood pieces with chatter marks are completely wasted.

As a rule, processing machines for wood blanks also have input rollers, which insure the required advance speed and the constant contact pressure. They are arranged immediately upstream of the rotating tool, opposite the support and guide surface.

In practice the use of input rollers is avoided whenever possible. The rollers are frequently pulled off their shafts, thus being removed. Usually they are arranged at the greatest possible distance from the support and guide surface and secured so that they do not come in contact with the wood blanks under any circumstances. Such operations can only be performed when the processing machine is at a standstill.

The reason for this procedure is that the wood blanks which have been processed with input rollers are usually fraught with irregularities, e.g. they particularly lack the rectilinear precision required for profiles for windows, furniture and so on.

The cause of this lack of rectilinear precision is the relatively high contact pressure of the input roller. However it is unavoidable, since the first cut or the first contact between the rotating cutting tool and the frontal surface of the front end of the wood blank sometimes causes shock or impact-like cutting reactions which, without a strong hold on the blank by corresponding contact pressure of the input roller, causes the blank to be pushed back or ejected.

However this relatively high contact pressure of the input roller, indispensable for the onset of cutting, has proven to be detrimental over the length of the blank. Each approximately linear compression load application on a wood blank resting on a rigid support causes a bending effect, under the influence of which the wood blank segments on both sides of the linear compression load, i.e. the input roller, have the tendency to lift off the rigid support. This deformation effect is pressure dependent and also depends on the consistency of the wood blank exposed to the linear pressure effect.

Since wood is a natural material, the ratio of irregularities to the straightness of the underlying surface is very variable. If one works with only one input roller in front of the machining shaft, the wood is pressed together on the feeding table and as soon as it leaves the advance assembly it springs back to its natural shape and therefore is not planed straight.

Attempts have been made to limit this effect by means of the fine adjustment and setting of the input roller. Fine setting means to select low contact pressure values. However, this step has its limitations, since wood blanks have by nature relatively high size variations. Hence even with the fine setting secure holding of the thinnest wood blank under the impact of cutting reactions occurring during the onset of cutting must be ensured.

In the case of extremely thick wood blanks even the finely set contact pressure can assume undesired values. In the case of thick zones in the length of the wood blank and in the case of a variable consistency independent from the thickness, bending effects of various extent still occur, translating into a reverse motion of the pressed-through wood, which again has a major influence on the straightness of the wood.

Because of all that, whenever possible the known processes will avoid the input roller. The expensive manual feeding and the acceptance of correspondingly higher residue and waste quotas leads to a higher straightness of the finished wood pieces and therefore has a more beneficial end effect.

U.S. Pat. No. 2,998,038 refers to the disadvantage of input rollers in wood processing machines. It is mentioned that the blanks which are longitudinally warped are also under a transverse strain when passing under the input roller, so that additional processing defects occur. Consequently, input rollers should be avoided and the wood blanks should be manually pushed in, until the first advance roller downstream of the first rotating tool takes over the conveying operation.

However, in the case of very short wood blanks even manual feed can create problems, so that one is compelled to work with the input roller and to tolerate irregularities.

There is also a so-called "calibrating" of wood blanks, where the rectilinear precision does not count too much, so that in these cases the input roller is always used, mostly because this method is simpler and more convenient than the previously described methods.

For mechanical feeding which replaces the manual feeding, conveyors can be arranged outside the respective processing machine on the input side, provided that these conveyors can be simply and conveniently adjusted to the required advance speed and provided that the wood blanks are long enough, so that these conveyors can act on the wood blanks until their front end reaches the advance roller.

However, in the case of many wood blanks from which, for instance, precision profiles for windows, furniture or the like are supposed to be made, the precondition of sufficient length is not met. Therefore, at least for this kind of work only the solution of manual feeding remains, which is expensive and involves residues and waste.

DE A 145 32 00 discloses a process of the aforementioned kind which avoids manual feeding and input rollers and wherein the wood blanks are pushed forward mechanically only as long as it takes for the transport or advance roller operating downstream of the rotating tool to pick up the conveying work.

Thereby a machine is used which has a chute-like storage the next blank to reach the tool. Long idle periods while the machine is operating are expensive and prevent quick, economic work.

The elimination of the input rollers and the manual feeding slows down the work and the timing, requires long refitting times and leads to an expensive, disturbance-prone machine. No advantage is achieved in comparison to manual feeding, rather the contrary applies. Input rollers are disadvantageous, but when compared with this known process, they are quicker and do not require refitting times, etc.

OBJECTS OF THE INVENTION

It is the object of the invention to provide a process for feeding a blank wherein the use of the input roller known per se can be simplified and facilitated, without having at the same time to accept the drawbacks resulting from the use of the input roller.

SUMMARY OF THE INVENTION

In order to solve this problem, in accordance with the invention, the wood blanks are pushed forward over a stationary guide surface by means of an input roller arranged immediately upstream of the tool and pressing the wood blanks against the guide surface. The input roller is rendered pressure-less in a controlled manner at the onset of the traction exerted by the advance roller. The input roller is restored to a conveying operation for a wood blank, as soon as the wood blank being processed has left the action range of the advance roller and before the next wood blank reaches the input roller.

In an advantageous development of the process according to the invention, the first conveying contact of front end of the wood blank with the first advance roller is detected by sensors, the wood blanks are pressed by means of a pneumatically actuated input roller, the contact pressure of the wood blanks is pneumatically cancelled, as soon as sensors, and the end of the conveying contact between the first advance roller and the rear end of each wood blank is detected and used for the control of the pneumatic pressure actuation of the input roller.

In the process of the invention the input rollers known are used for engaging the front ends of the wood blank, to move the front ends through the machining by the rotating tool up to the conveying contact of the blank with the first advance roller. At the precise moment of conveying contact between the front end of the wood blank and the first advance roller, detected by sensors or by other known means, either the input roller is controllably lifted or the contact pressure exerted by the input roller is pneumatically cancelled. From this moment on the wood blanks are transported only by the first advance roller, just like during manual feeding.

Since the contact pressure of the input roller has only a short-term, somewhat timed action, and in the advantageous development of the invention this action is also limited only to the frontal area of the wood blank, no bending effects can occur over the length of the blank, as a result of high input roller pressure, and also no straightness deviations result. Precision profiles for windows, furniture and the like can be finished just like when manual feeding is used.

However, at the same time the drawbacks of manual feeding, namely expensive human labor, as well as residues and waste due to chatter marks, can be avoided.

Short precision profiles, where even manual feeding can create problems, can be advantageously finished to be absolutely straight for the first time with the method of the invention. Up to now in these cases it was necessary to use continuously running input rollers, with bending effects and corresponding deformations.

In order to functionally pressure-actuate the input rollers, the invention detects by sensors the passage of the rear end of the wood blank through a certain reference point.

It is suitable to use the same sensor detecting the conveying contact between the first advance roller and the front end of the wood blank for the detection of the interruption of this conveying contact, when the rear end of the finished wood blank passes the first advance roller. A reverse, adjustable switching step then triggers the renewed pneumatic pressure actuation of the input roller, so that the next wood blank is taken up at its front end and fed up to the point where it reaches the first advance roller.

Within the framework of the invention a second sensor can be used at another reference point, in order to again pressure-actuate the input roller.

Particularly in the case when short wood blanks follow each other at short intervals, this reference point or sensor, can be located at or close to the input roller, so that the input roller can be already switched to function or is pneumatically pressure-actuated when the rear end of the wood blank has travelled past the nonpressured input roller.

The pneumatic, timed pressure actuation of the input rollers is handy because the processing machines mostly already have pneumatic equipment. However, it is possible also to use other mechanical means for the timed pressure actuation or the timed pressure interruption of the input roller.

Known contact or limit switches arranged in the path of the wood blanks or detecting the thrust of the first advance rollers can be used as sensors. But it is also possible to operate in a contactless manner, e.g. with photoelectric barriers or the like.

The invention overcomes or avoids the heretofore known obstacle in the use of input rollers, consisting in the fact that they could be used either only in continuous operation or only after previous removal or disengagement during machine standstill, by using periodic or timed control of the pressure actuation and pressure interruption, so that one can always use the input-roller feeding without the disadvantages of its continuous operation and without assembly or refitting while the machine is at a standstill.

A simple switch can interrupt the operation of control elements or sensors, when calibration is required and the input rollers have to work continuously.

SPECIFIC DESCRIPTION

Figure 1:
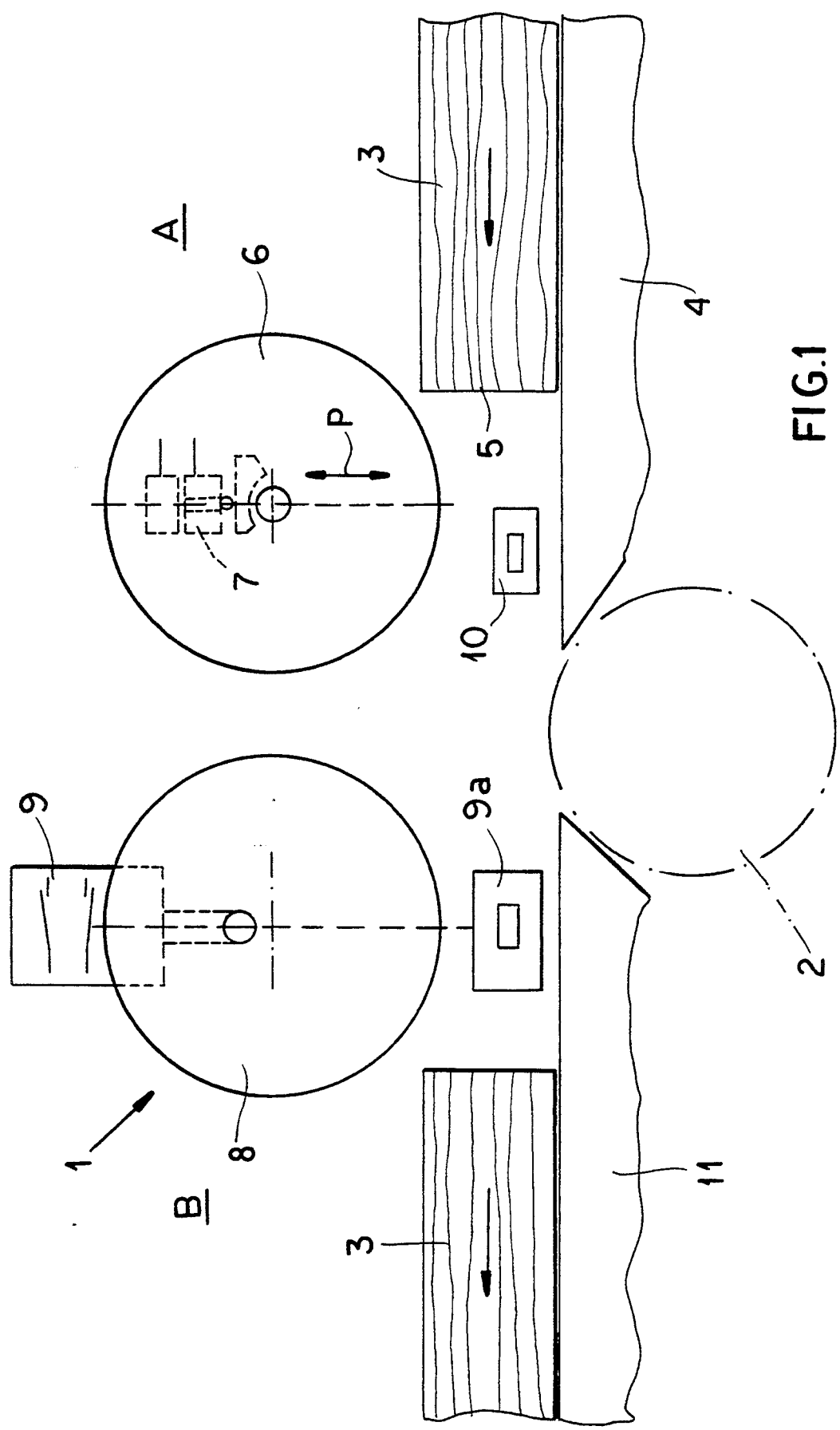
FIG. 1 is a diagrammatic side elevational view of a planing machine or the like, suited for carrying out the process of the invention, in the situation between machining processes.
Figure 2:
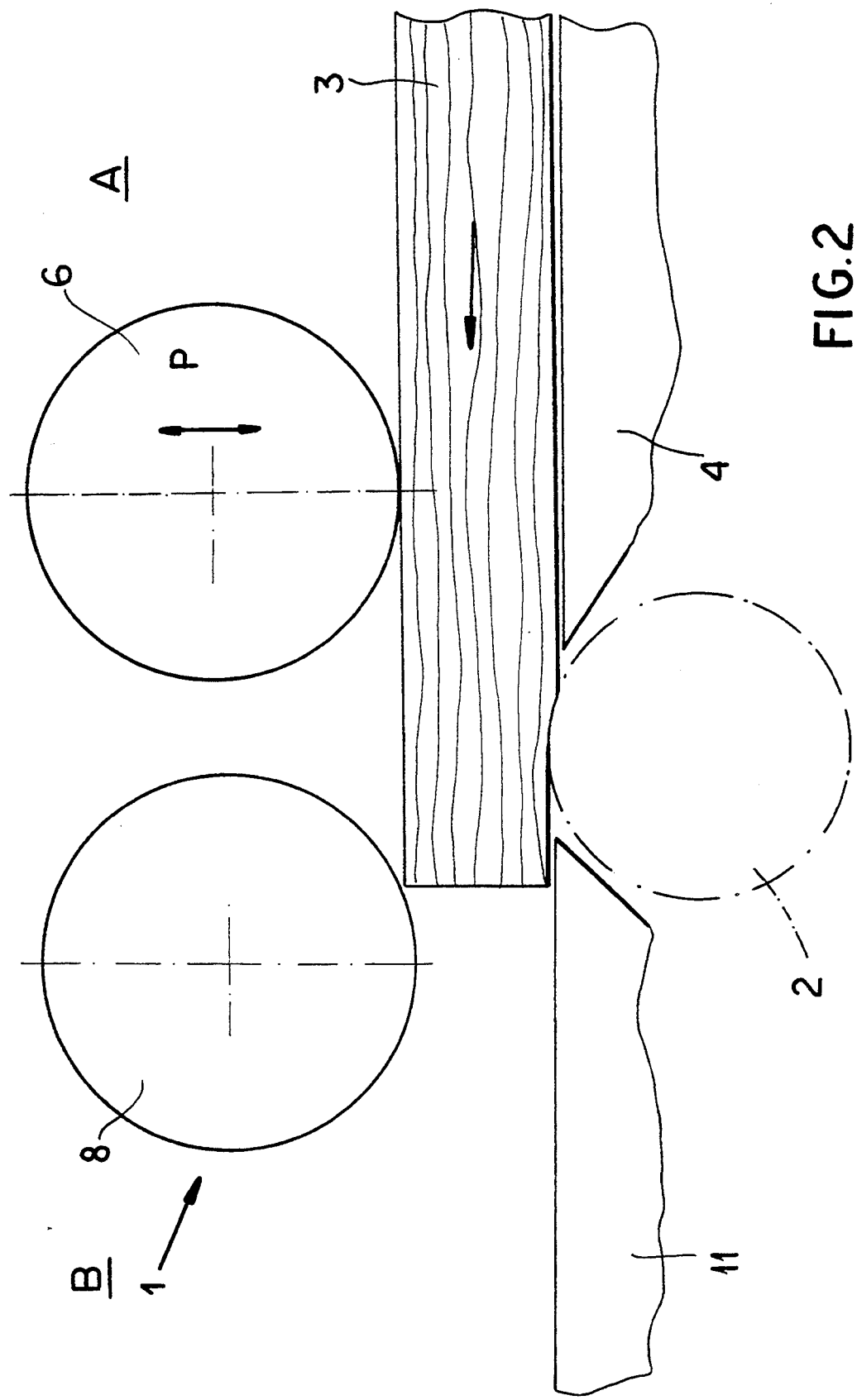
FIG. 2 is a side elevational view of the planing machine according to FIG. 1 at the start of the machining process immediately before the moment when the input roller is relieved of pressure.
Figure 3:
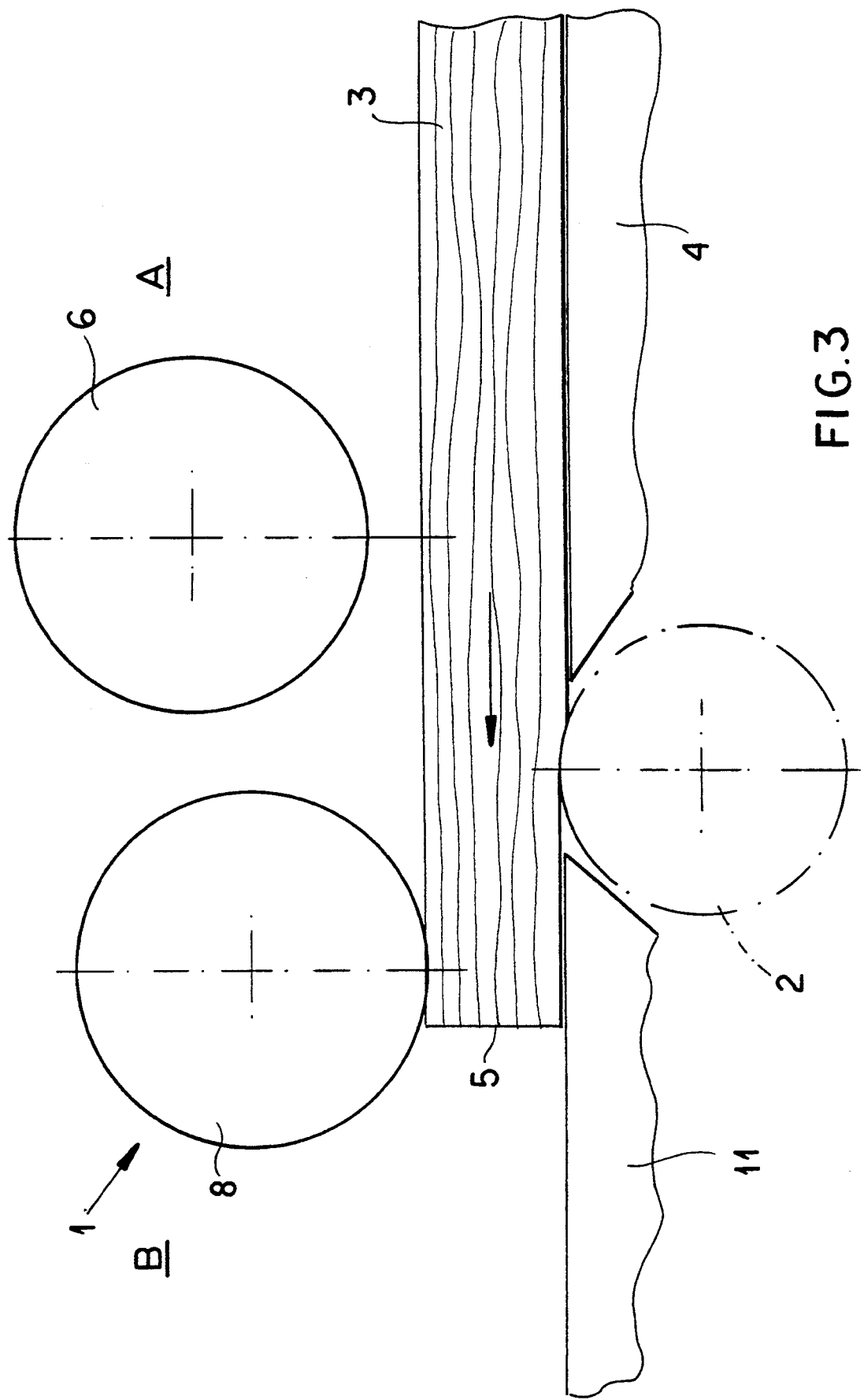
FIG. 3 is a side elevational view of the planing machine according to FIGS. 1 and 2 in the machining state when the input roller is pressureless or disengaged.

The FIGS. 1 to 3 show schematically a planing machine 1 representative of any wood machining equipment. Therefore it could be a four-edge planing machine, a thicknessing machine, an automatic profile-cutting machine, as well as a planing, grooving and keying machine or the like.

The planing machine 1 is provided with at least one driven machining tool, here a planer head 2.

Wood blanks 3 lying on a planer table 4 on the incoming side A of the machine are slid with their front end leading and in a longitudinal direction under an input roller 6. A pneumatic working component 7, controlled by fluid pressure, actuates the input roller 6 and presses it against wood blanks 3. A drive not shown in the drawing rotates the input roller 6 which is located upstream of the planer head 2.

Downstream of the planer head 2 there is a pressure-actuated advance roller 8 driven to rotate, whose conveying action on the wood blank 3 is so strong that the latter is pulled through the machining zone of planer head 2.

FIG. 1 illustrates the situation between two processing stages of wood blank 3, the input roller 6 and the advance roller 8 are in a lowered position.

FIG. 2 shows that the front end 5 of the wood blank 3 has already passed the planer head 2 and is slidably supported on a reference table 11, in touch but not yet in conveying contact with the advance roller 8, while the input roller 6 is "still" pressure-actuated and conveying.

FIG. 3 reproduces the situation immediately after that shown in FIG. 2. The front end 5 of wood blank 3 has pressed the advance roller 8 upward, against its own pressure and the blank is, therefore, conveyed by roller 8.

The upward thrust of the first advance roller 8 was detected via sensors like a switch 9 responsive to upward motion of the shaft.

The switching impulse coming from the sensor is used in order to render the input roller 6 pressureless. The input roller can, see FIG. 3, also be lifted off the wood blank 3.

The wood blank 3 is finished and finally leaves also the advance roller 8, see FIG. 1. The switch 9 is again in its initial position and with its new switching impulse has either pushed the input roller 6 downward by pressure actuation or optionally moved it downward from its lifted position, by correspondingly controlling the pneumatic component 7.

Instead of a switch 9 at the advance roller 8, it is also possible to use sensors 9a in the path of wood blank 3, e.g. as limit switches or as contactless switches.

In order to return the input roller 6 to its working position or at least to the position where it can again be actuated by pressure, a switch 10 timed to work with an advance can be used in the path of the wood blank 3, this switch being located downstream of input roller 6 and switches at the passage of the rear end of wood blank 3.

In this way wood blanks 3 are subjected to pressure and conveyed by the input roller 6 only in the area of their front ends 5 and only until the front ends are taken up and conveyed by the advance roller 8.

Deformations due to the bending effect normally occurring in the wood blanks 3 as a result of the pressure action of the input roller 6 are this way avoided, since the wood blanks 3 are processed over their length without engagement by the input roller 6.

Also, no chatter marks like those occurring during manual feeding result at the front end 5 of the wood blank 3, since the short-term and timed operation of input roller 6 insures an optimal contact pressure and an even advance speed.

If it is necessary to work with a continuously operating input roller 6, e.g. for calibration, the switches 9, 9a, 10 are rendered inoperative and the input roller 6 is set to operate continuously.

In this way manual feeding is advantageously avoided and at the same time the possibility is created for the high-precision processing of wood blanks 3 as long or as short as desired, because of the precision decrease due to the pressure exerted by the input roller 6 is prevented in that the latter acts upon the front ends 5 of the wood blanks 3 only until they start to be conveyed by the first advance roller 8.

All individual features or combinations thereof disclosed in the claims, the specification and/or the drawing are considered as an essential part of the invention.

The protection of the invention extends not only to the features of the individual claims, but also to their combination.

I claim:

1. A process for machining a wood blank, comprising the steps of:
   (a) feeding one elongated wood blank on a support and guide surface toward a machining location at which a tool is driven which is capable of removing material from said one elongated wood blank;

(b) engaging a leading end of said one elongated wood blank with an input roller disposed upstream of said tool with respect to a direction of feed of said one elongated wood blank, and simultaneously driving said input roller and pressing said roller against said one elongated wood blank to advance said leading end of said one elongated wood blank into engagement with said tool and past said tool, said one elongated wood blank being machined by said tool while said tool is in engagement with said one elongated wood blank;

(c) thereafter engaging said leading end of said one elongated wood blank with an advance roller located downstream of said tool in said direction and rotating said advance roller and pressing said advance roller against said one elongated wood blank so that said blank is drawn by said advance roller past said tool for machining of said one elongated wood blank over a length thereof;

(d) controlledly relieving a pressure with which said input roller presses against said one elongated wood blank immediately upon engagement of said advance roller with said leading end of said one elongated wood blank; and (e) restoring said input roller to a position in which said input roller can engage a following elongated wood blank fed on said surface to be machined upon disengagement of a trailing end of said one elongated wood blank by said advance roller and before said following elongated wood blank has reached said input roller.

2. The process defined in claim 1 wherein said input roller is pressed by pneumatic pressure against said one elongated wood blank and the pressure of said input roller upon said one elongated wood blank is relieved by pneumatically canceling pressure on said input roller.

3. The process defined in claim 2, further comprising the step of detecting a passage of said leading end past said advance roller and pneumatically actuating said input roller to restore said input roller into a position in which said input roller can engage a leading end of said following elongated wood blank.

4. The process defined in claim 3 wherein the engagement of said leading end of said one elongated wood by said advance roller is detected by operating a switch responsive to lifting of said advance roller.

5. The process defined in claim 3 wherein the passing of said trailing end of said one elongated wood of said advance roller is detected by operating a switch responsive to dropping of said advance roller.

6. An apparatus for machining a wood blank, comprising:

a support and guide surface along which one elongated wood blank can be fed toward a machining location;

a driven tool at said location and capable of removing material from said one elongated wood blank;

a driven input roller disposed above said surface at a location upstream of said tool for engaging a leading end of said one elongated wood blank and provided with means for pressing said roller against said one elongated wood blank to advance said leading end of said one elongated wood blank into engagement with said tool and past said tool, said one elongated wood blank being machined by said tool while said tool is in engagement with said one elongated wood blank;

a driven advance roller disposed above said surface downstream of said tool for thereafter engaging said leading end of said one elongated wood blank so that said blank is drawn by said advance roller past said tool for machining of said one elongated wood blank over a length thereof;

means for controlledly relieving a pressure with which said input roller presses against said one elongated wood blank immediately upon engagement of said advance roller with said leading end of said one elongated wood blank; and means for restoring said input roller to a position in which said input roller can engage a following elongated wood blank fed on said surface to be machined upon disengagement of a trailing end of said one elongated wood blank by said advance roller and before said following elongated wood blank has reached said input roller.

* * * * *